US008949275B1

(12) United States Patent
Aasuri-Maringanti

(10) Patent No.: US 8,949,275 B1
(45) Date of Patent: Feb. 3, 2015

(54) INTER-APPLICATION TO DO LIST MANAGEMENT

(75) Inventor: Ramanuja-Chary Aasuri-Maringanti, Freemont, CA (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 13/097,282

(22) Filed: Apr. 29, 2011

(51) Int. Cl.
    *G06F 17/30* (2006.01)
(52) U.S. Cl.
    CPC ............................... *G06F 17/30716* (2013.01)
    USPC ........................................... 707/791; 707/802
(58) Field of Classification Search
    CPC .................... G06F 17/30038; G06F 17/30716;
             G06F 17/30882; G06F 17/30896; G06F 17/30902
    See application file for complete search history.

(56) References Cited

U.S. PATENT DOCUMENTS

| 6,505,219 | B1* | 1/2003 | MacLean et al. | 715/205 |
| 7,269,798 | B2 | 9/2007 | Nonaka et al. | |
| 7,797,196 | B1* | 9/2010 | Aaron et al. | 705/26.1 |
| 8,005,710 | B2* | 8/2011 | Vishnumurty et al. | 705/7.11 |
| 8,032,553 | B2* | 10/2011 | Lippe et al. | 707/781 |
| 8,082,308 | B1* | 12/2011 | Filev | 709/206 |
| 2002/0169650 | A1* | 11/2002 | Dougherty et al. | 705/8 |
| 2006/0143613 | A1* | 6/2006 | Lippe et al. | 718/100 |
| 2007/0129976 | A1* | 6/2007 | Hochberg et al. | 705/7 |
| 2007/0220016 | A1* | 9/2007 | Estrada et al. | 707/100 |

OTHER PUBLICATIONS

"HyperOffice—Task management Software", downloaded on Feb. 24, 2011 from http://www.hyperoffice.com/Ip3/project_management/task-management.php?affcode=400.
"Google—Get ToDo on Your Google Homepage", downloaded on Feb. 24, 2011 from http://www.google.com/ig/adde?moduleurl=www.labpixies.com/campaigns/todo/todo.xml.

* cited by examiner

*Primary Examiner* — Angelica Ruiz
(74) *Attorney, Agent, or Firm* — Morgan, Lewis & Bockius LLP

(57) ABSTRACT

A system and method for inter-application to do list management uses task tags embedded in documents to identify tasks related to the documents. The method allows users to embed a task tag in a document which is identified by a task processor. The task processor generates a task record, which can be stored in a task database, and transmits a task notification to one or more users based on task parameters defined in the task tag. The task record can be modified based on input from users and subsequent notifications can be generated based on the modifications to the task record. Users can access a task database to review and modify stored task records according to predefined permissions associated with the task record.

39 Claims, 6 Drawing Sheets

| Task ID | Task Descr. | Task Assignor | Task Assignee | Due Date | Priority | Notification Sent | Document | Permissions | Task Accepted | Task Declined | Task Status | Reminder | Task Completed | Comments |
|---|---|---|---|---|---|---|---|---|---|---|---|---|---|---|
| 101 | Review Proposal | John Doe | Joe Smith | 10/26/2010 | Normal | 10/24/2010 | XYZ_20101015.txt | Assignor/ All; Assignee/ None | 10/24/2010 | | Complete | 10/25/2010 | 10/25/2010 | |
| 102 | Review Draft | Jane Doe | Jane Smith | 11/26/2010 | Low | 11/24/2010 | 1865920.txt | Assignor/ All; Assignee/ None | 11/25/2010 | | In Progress | 11/15/2010 | | |
| 103 | ... | ... | ... | ... | ... | ... | ... | ... | ... | ... | ... | ... | ... | ... |

FIG. 4

Task ID: 101 ⟋502                              500

Task Description: Review Proposal

Task Assigned By: John Doe

Task Assigned To: Joe Smith

Requested Task Completion Date: October 26, 2010

Task Priority: Normal

Notification(s) Sent: October 24, 2010

Document: XYZ_20101015.txt ⟋504

Task Status: Pending

Reminder: October 25, 2010

Task Status: Complete

Comments:

INTER-APPLICATION TO DO LIST MANAGEMENT

BACKGROUND

The present disclosure relates generally to managing tasks, and more particularly to inter-application to do list management.

The management of tasks generally involves the use of lists identifying tasks that need to be completed by various people by various dates and/or times. These types of lists are typically referred to as "to do" lists. Currently, users manage tasks by manually adding tasks and related information to a to do list as the tasks are assigned. For example, when a manager assigns a task to a worker, the worker may add the task to the worker's to do list with information related to the task such as a description of the task, the manager who assigned the task and the date by which the task needs to be completed. The manager may also add the task to a to do list kept by the manager so as to remind the manager of the task and related information. This results in multiple parties individually tracking and managing tasks using multiple lists. It also requires both the manager and the worker to enter similar information regarding tasks into two separate lists thereby doubling the time required to enter a particular task.

Many tasks concern documents such as word processing documents, spreadsheets, presentations, and other documents. Tasks related to documents typically require the documents to be identified in the task entry. In addition to the extra time required to enter information concerning the document into a task entry, misidentification of a document in a task entry can result in the incorrect document being considered with respect to a task. For example, if a manager assigns a task of reviewing a text document and incorrectly identifies the version of the text document, a worker assigned the task of reviewing the document may review the wrong version.

BRIEF SUMMARY

In one embodiment, a method for managing task assignments includes identifying a task tag embedded in a document. The task tag comprises task parameters used to generate a task record. The task record is linked to the document using at least one of the task parameters. The task record is stored in a task database.

In one embodiment, an article of manufacture includes a tangible computer-readable medium storing instructions. The instructions, when executed on a computing device cause the computing device to perform operations. The operations comprise identifying a task tag embedded in a document. The task tag comprises task parameters which are used to generate a task record. The operations also link the task record to the document using at least one of the task parameters and store the task record in a task database.

In another embodiment, a system for managing task assignments comprises a task processor. The task processor is configured to identify a task tag embedded in a document. The task tag comprises task parameters used to generate a task record. The task processor is also configured to link the task record to the document using at least one of the task parameters and to store the task record in a task database.

In one configuration, a method for managing task assignments comprises processing a document to identify a plurality of task parameters. The task record is linked to the document using one of the plurality of task parameters and the task record is stored in a task database.

In one embodiment, an apparatus for managing task assignments comprises means for identifying a task tag embedded in a document, the task tag comprising task parameters, means for generating a task record based on the task parameters, means for linking the task record to the document using at least one of the task parameters, and means for storing the task record in a task database.

In one embodiment, a graphical user interface comprises a field configured to display information pertaining to a task related to a document. The interface also has a field configured to display comments from a task assignor and for receiving comments from a task assignee. An additional field of the interface is configured to accept input from the task assignee indicating whether the task assignee accepts the task.

In one embodiment, a method for automatically generating a task associated with a document comprises receiving input within the document from a task assignor indicating that the task assignor wants to associate a task with the document. The method also includes receiving task parameters from the task assignor, embedding a task tag in the document, receiving input from the task assignor releasing the document, and scanning the released document to identify the task tag. A task record is generated based on the task parameters of the task tag and the task record is stored in a task database. A task notification is generated and sent to a task assignee identified in the task parameters.

These and other advantages of the disclosure will be apparent to those of ordinary skill in the art by reference to the following detailed description and the accompanying drawings.

BRIEF DESCRIPTION OF THE DRAWINGS

FIG. 4 depicts an example of a task record;

DETAILED DESCRIPTION

In one embodiment, a user can assign a task associated with a document by embedding a task tag in the document. For example, while accessing the document, the user inserts a task tag which is subsequently recognized by a task processor that may be implemented in various ways such as hardware or a software programmable module. The task tag is interpreted by the task processor as an indication that the user wants to associate a task with the document. The task tag comprises task parameters entered by the user identifying the task, people associated with the task, and dates related to the task. The task processor uses the information contained in the task parameters to generate a task record and one or more task notifications that can be transmitted to people associated with the task. Task records can be viewed and modified in accordance with permissions defined for each user.

Figure 1:
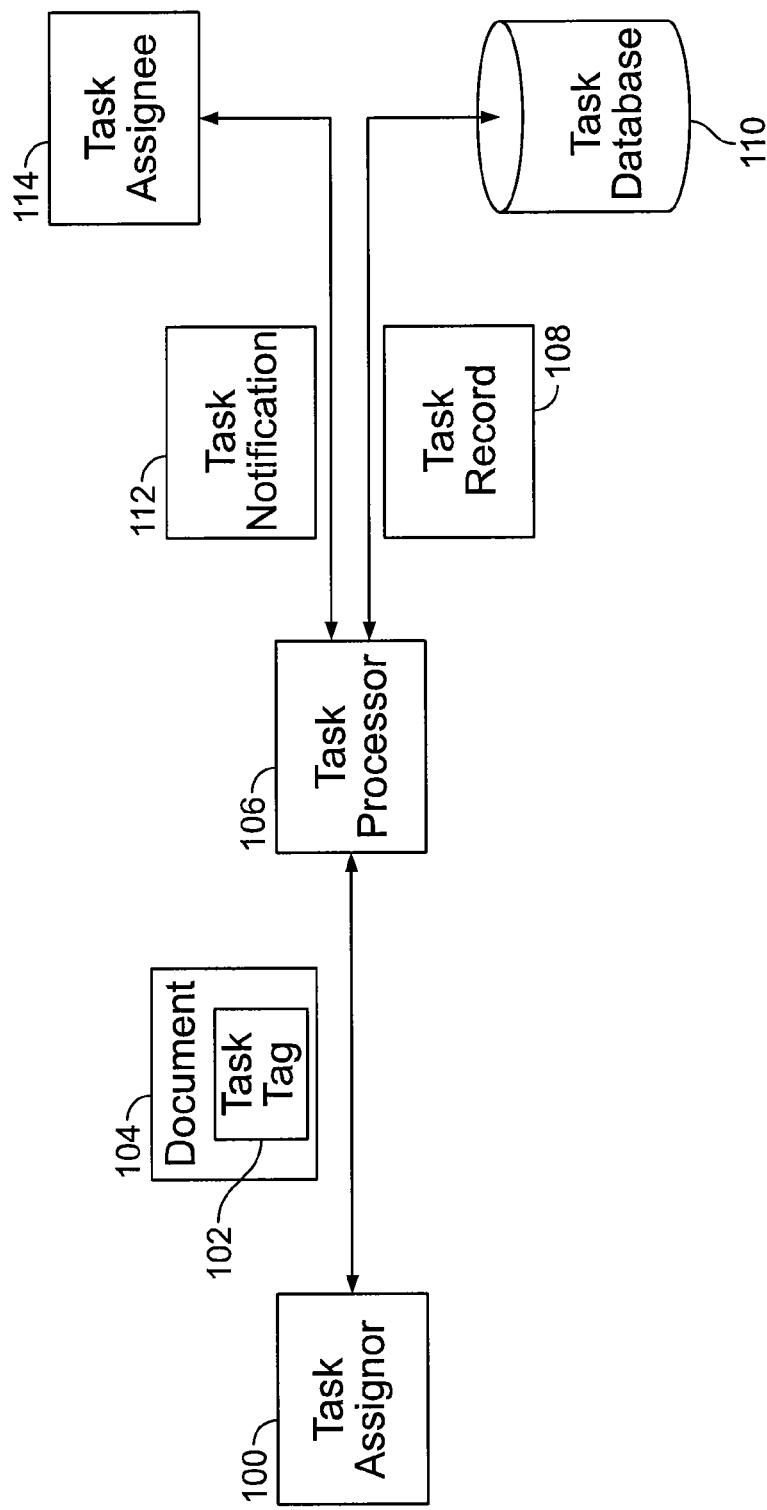
FIG. 1 depicts a high level schematic of a system for managing task assignments.

FIG. 1 depicts a high level schematic of a system for managing task assignments according to one embodiment. A task assignor embeds a task tag 102 in a document 104 using task assignor device 100 which is a device associated with the task assignor (i.e. the person assigning the task). Task tag 102 comprises task parameters related to a task. Document 104 is analyzed by task processor 106 to identify task tag 102 after the document is sent, released, or shared. In response to identification of task tag 102, task processor 106 generates task record 108 based on the task parameters. Task record 108, in one embodiment, is stored in task database 110. Task processor 106 also generates task notification 112 based on the task parameters. Task notification 112, in one embodiment, is transmitted to task assignee device 114 which is associated with a task assignee (i.e. the person assigned to complete the task). FIG. 1 is described in more detail below in conjunction with the method FIG. 2.

Figure 2:
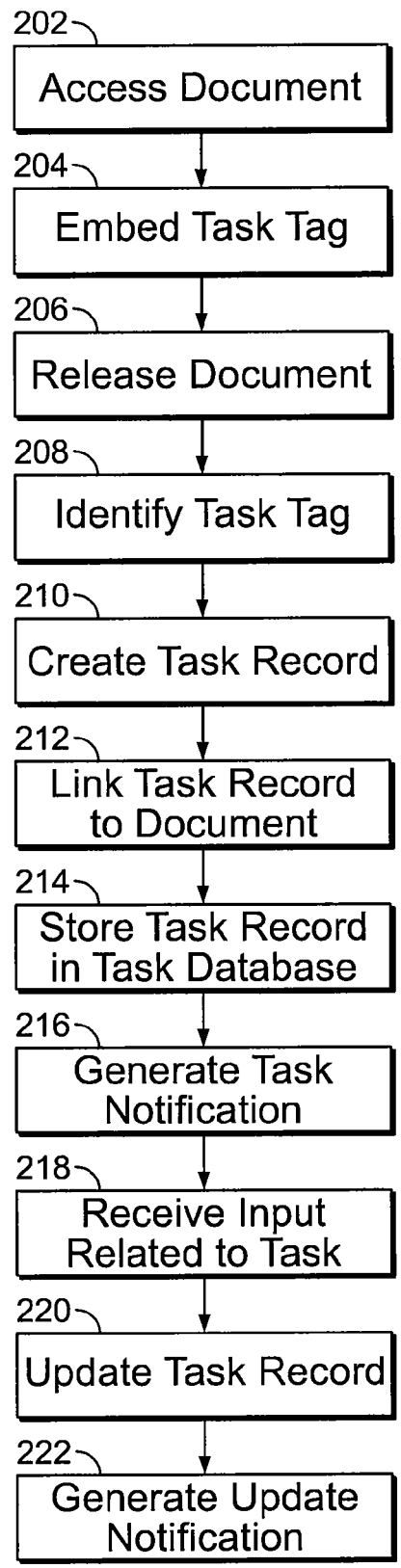
FIG. 2 depicts a flow chart of a method for managing task assignments.

FIG. 2 depicts a flow chart of a method for managing task assignments. According to one embodiment of the invention, at step 202, a user accesses a document (e.g. document 104 of FIG. 1). It should be noted that a user accessing a document, as used herein, includes, inter alia, creating, opening, and modifying a document. A document can be any type of electronic document or communication such as a word processing document, a spreadsheet, a presentation, a database, an email, an instant message, SMS message, etc. In one embodiment, a document is accessed using an application stored locally at a user's personal computer. For example, a user may have a word processing application located on a storage device associated with the user's computer. The word processing application may be executed allowing the user to access a word processing document locally at the user's computer. Applications for accessing documents may also be stored remotely and accessed by a user over a network. For example, a user may communicate with a server over a network using the user's computer. The server supports the application and allows the user to access documents using the application remotely over a network connection.

At step 204, a user embeds a task tag 102 document 104. Task tag 102, in one embodiment, is a string of characters having a particular format allowing it to be recognized as task tag 102. Task tag 102 comprises task parameters which provide information related to a task. Task tag 102 may be embedded in document 104 in a variety of ways. In one embodiment, a user enters a sequence of characters into document 104 which identify the sequence as a task tag. For example, a user may enter the string of characters "<TASK:" which can be recognized by task processor 106 as the beginning of a task tag. The string of characters, in one embodiment, is followed by information specifying the task, the person the task is assigned to, the person assigning the task, and the date by which the task needs to be completed. In one embodiment, a task tag comprises the string of characters "<TASK: task information; task assigned to; task assigned by; requested task completion date.>" In this embodiment, the information contained in the task tag is recognized based on the information's location within the task tag. For example, the information immediately following the string "<TASK:" is recognized as task information. A task tag in which information is identified based on location in the tag, in one embodiment, is in the following form: "<TASK: Review Proposal; Joe Smith; John Doe; Oct. 26, 2010.>" In this embodiment, a user must correctly order the information contained in the task tag for the information to be correctly identified and/or interpreted by the task processor.

In another embodiment, information in a task tag may be identified using prefixes or headers preceding information related to a task. For example, in one embodiment, the acronym "TI", which stands for Task Information, in a task tag indicates that the information following the acronym describes the task. A task tag in which information is identified by acronyms, in one embodiment, is in the following form "<TASK: TI, Review Proposal;". In this embodiment, a user identifies task related information in the task tab using acronyms or other identifiers.

Figure 3:
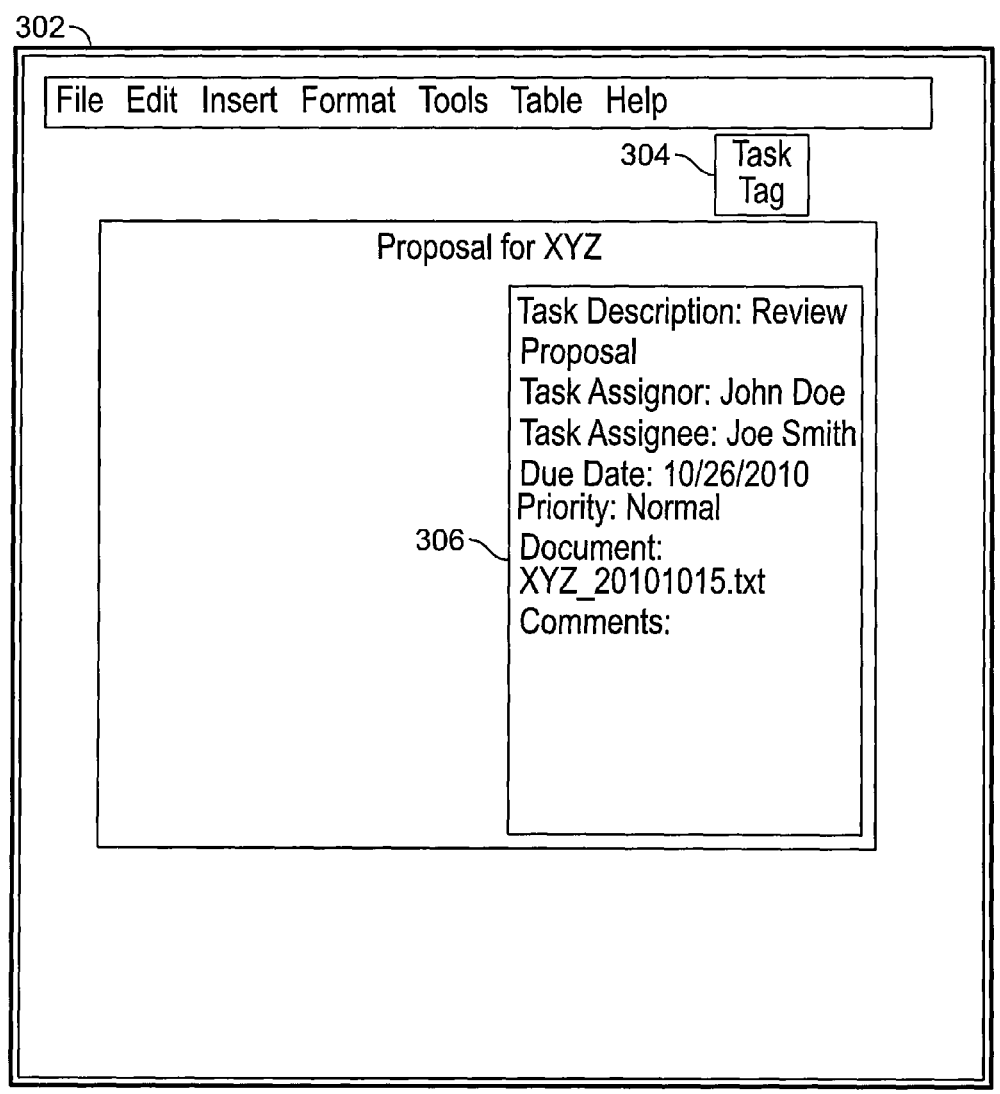
FIG. 3 depicts a word processing application having a virtual button for embedding a task tag.

In another embodiment, a user creating a document may click a virtual button to initiate creation of a task tag. FIG. 3 depicts a word processing application having a virtual button for embedding a task tag. As shown in FIG. 3, window 302 depicts a word processing application having virtual button 304 which may be selected by a user to embed a task tag within a word processing document. In one embodiment, a user selecting task tag button 304 (e.g. clicking button 304 with a mouse) is presented with a pop up window 306 having fields in which a user may enter information concerning the task, such as task description, person assigning the task, person the task is assigned to, requested completion date of the task, etc. The information entered into the fields of the pop up window 306 by a user, in one embodiment, is then converted into task tag which is embedded into the document. In one embodiment, the information entered into the fields of the pop up window 306 is used to generate a task tag that is embedded in the document as metadata. Task tags embedded in a document as metadata may or may not be displayed within the document.

Returning to FIG. 2, at step 206 a user releases the document. A user releasing a document, as the term is used herein, includes a user releasing a document for use by others, sending a document or communication to another user, or sharing a document with other users. In one embodiment in which the document is an electronic communication such as an email or an instant message, at step 206 the communication is sent to a user designated recipient in response to a user input such as clicking a virtual send button or similar input indicating that the electronic communication should be transmitted. In one embodiment in which a user is creating or modifying a document such as a word processing document or presentation, at step 206 the document is released or shared in response to user input indicating that the document is to be released or shared. A user can release a document by saving the document or by providing specific input that the document is to be released to other users for use or viewing by clicking a virtual button or other input. A user can share a document by providing specific input that the document should be made accessible to others for use, modification, and viewing. A user releasing or sharing a document can indicate specific users or groups of users to share or release the document to.

At step 208, task tag 102 embedded in document 104 is identified by task processor 106. Task processor 106 is shown in FIG. 1 in communication with task assignor device 100, task assignee device 114, and task database 110 in one embodiment. Task processor 106 receives document 104 having task tag 102 from task assignor device 100. Task processor 106, in one embodiment, scans document 104 for task tag 102 which may be identified by recognition of a character string such as "<TASK:" as described above. Task tag 102 can be identified in other ways. For example, metadata associated with document 104 may contain information indicating that a task tag 102 is embedded in document 104.

At step 210, task processor 106 creates task record 108 based on information contained in task tag 102. Task processor 106 creates task record 108 by parsing the information contained in task tag 102. In one embodiment, task processor parses task tag 102 using separators, such as semicolons (";") to determine particular portions of the information in task tag 102 pertaining to task information. As described above, the location of information within task tag 102 can be used to identify particular information such as task description, person assigning the task, etc. Also, as described above, acronyms or other identifiers may be similarly used to identify particular information within task tag 102. Task record 108, in one embodiment, is stored in task database 110. Task record 108 includes information described in task tag 102 as well as additional information obtained later such as acceptance of a task by the person the task is assigned to.

FIG. 4 depicts an example of task record 108 of FIG. 1. Task record 400 shown in FIG. 4 includes task identification (ID) field 402 which is used to uniquely identify a particular task record 400. Task record 400 in one embodiment also includes fields for task description 404, task assigned by 406, task assigned to 408, requested task completion date 410, task priority 412, and reminder 422. Task fields 404-412 and 418, in one embodiment, contain information provided by the user assigning the task. Additional fields including task ID field 402, notification(s) sent 414, task accepted 420, task declined 422, task completion date 428, task status 424, and comments 430 can be populated using input from the person assigning the task, the person the task is assigned to, or based on information provided by task processor 106.

Returning to FIG. 2, at step 212, task processor 106 links task record 400 to document 104. In one embodiment, document 104 is linked to record 400 by populating document field 416 of task record 400 with the file name and location of document 104. Document 104 may also be linked to record 400 using a unique document identifier generated by task processor 106. At step 214, task record 400 is stored in task database 110.

At step 216 task processor 106 generates task notification 112. Task notification 112, in one embodiment, is an electronic communication sent to the person assigned to complete the task. The electronic communication, in one embodiment, is an email, but can be an instant message, SMS, or other electronic communication. Task notification 112 alerts the person assigned to complete the task that a new task record, such as task record 400 of FIG. 4, has been created. Task notification 112, in one embodiment contains information related to the task, such as the task description, person who assigned the task, as well as a link to task record 400. Task record 400 may be viewed by a user by clicking the link contained in task notification 112.

Figure 5:
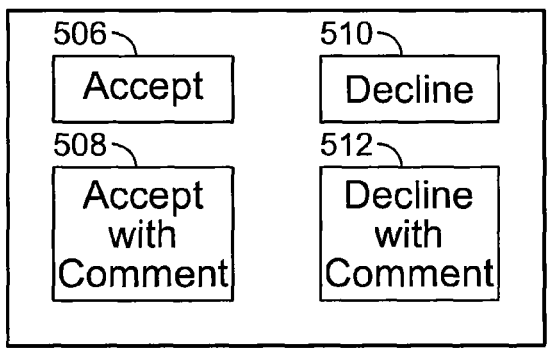
FIG. 5 depicts an example of a task notification.

FIG. 5 depicts an example of a task notification. In one embodiment, task notification 500 (112 of FIG. 1) includes an interface for receiving input from a user comprising a plurality of virtual buttons 506, 508, 510, and 512. A user assigned a task can respond to the assignment via one of the virtual buttons. A user can accept the task by clicking accept button 506. A user can also click accept with comment button 508 that allows the user to enter a comment which can be included in a notification sent to the user who assigned the task in response to the acceptance of the task. A user can also decline the task by clicking decline button 510. A user can also click decline with comment button 512 that allows the user to enter a comment that can be included in a notification sent to the user who assigned the task in response to the declined task. A user can view the document associated with the task by clicking link 504 contained in task notification 500. Link 504, as shown in FIG. 5, in one embodiment is depicted as underlined text. Link 504 may be depicted in other ways such as a virtual button.

Returning to FIG. 2, at step 218, input related to the task, such as an indication that one of virtual buttons 506, 508, 510, or 512 was selected by a user, is received by task processor 106. At step 220 task record 400 is updated based on the response to the task notification by the user assigned to the task. For example, if a user assigned to the task accepts the task by clicking accept button 502, task accepted field 416 is populated with the date of acceptance. It should be noted that step 220 can occur each time an event or input concerning a related task occurs. For example, if the due date for a task passes and input indicating that the task is complete has not been entered, task status field 424 may be changed to indicate that the task completion is overdue. Task record 400 may also be updated based on changes to requested task completion date field 410, reminder field 422, and task status field 424 as well as changes to other fields. In one embodiment, task status field 424, as well as other fields, may be updated based on not receiving a response to task notification 108. For example, if a user assigned a task does not respond to a task notification after a predetermined period of time, it may be assumed that the task assignee has declined the task and task parameters, such as task declined field 422 may be populated with the date that the end of the predetermined period of time.

At step 222, an update notification is generated based on changes to task record 400. In one embodiment, notifications may also be generated based on information contained in task record 400. For example, reminder field 422, in one embodiment, can trigger a reminder notification to be sent to a user assigned to complete the task when the current date is the same date as the date contained in reminder field 426.

In one embodiment, users can access task database 110 in order to review and modify task entries according to permissions. For example, a user assigned to perform a task may be permitted to update task status field 424. A user who assigned a task may be permitted to modify all fields of a task record such as task record 400. Access to task database 110 allows users to review tasks as desired in order to stay informed of the status of task entries.

In one embodiment, task notification 500 includes a link 504 to a document or documents related to the assigned task. A user viewing the task notification can open the related document or documents by clicking link 504 in the task notification. After opening a document using a link contained within the task notification, a user can review and modify the document through an application interface, such as window 302 of FIG. 3. In one embodiment, after a user has completed a task related to the opened document, the user may click on task tag button 304. In response to the user clicking task tag button 304 in a document related to a task, a pop up window or other information soliciting method is presented to the user asking whether the user wants to create a new task tag or modify an existing task record. In one embodiment, a user selecting the modify an existing task record option can modify information contained in an existing task record related to the document in order to update task status field 424 and other fields as necessary. If multiple task records are related to the open document, a user will be presented with a list of the related task entries from which to choose. In one embodiment, only task records assigned to the user viewing the opened document and task records related to the opened document are displayed to the user in order to prevent confusion by displaying task records concerning tasks not assigned to the user viewing the open document.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 1 and/or 2. Certain steps of the methods described herein, including one or more of the steps of FIGS. 1 and/or 2, may be performed by a server or by another processor in a network-based cloud-computing system. Certain steps of the methods described herein, including one or more of the steps of FIGS. 1 and/or 2, may be performed by a client computer in a network-based cloud computing system. The steps of the methods described herein, including one or more of the steps of FIGS. 1 and/or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 1 and/or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
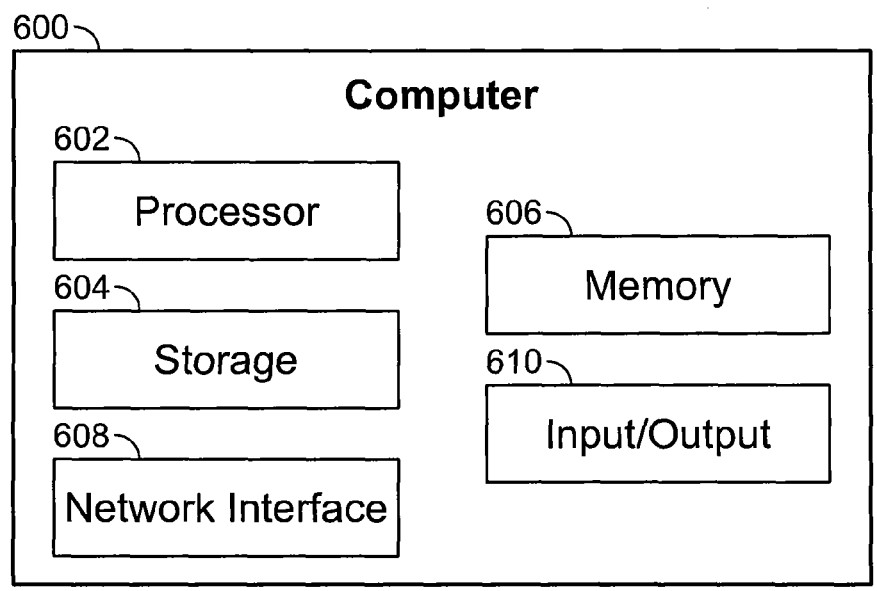
FIG. 6 depicts a high-level block diagram of an exemplary computer that may be used to implement various systems, apparatus and methods described herein.

A high-level block diagram of an exemplary computer that may be used to implement systems, apparatus, and methods described herein is depicted in FIG. 6. Computer 600 comprises a processor 602 operatively coupled to a data storage device 604 and a memory 606. Processor 602 controls the overall operation of computer 600 by executing computer program instructions that define such operations. The computer program instructions may be stored in data storage device 604, or other computer readable medium, and loaded into memory 606 when execution of the computer program instructions is desired. Thus, the method steps of FIGS. 1 and/or 2 can be defined by the computer program instructions stored in memory 606 and/or data storage device 604 and controlled by processor 602 executing the computer program instructions. For example, the computer program instructions can be implemented as computer executable code programmed by one skilled in the art to perform an algorithm defined by the method steps of FIGS. 1 and/or 2. Accordingly, by executing the computer program instructions, the processor 602 executes an algorithm defined by the method steps of FIGS. 1 and/or 2. Computer 600 also includes one or more network interfaces 608 for communicating with other devices via a network. Computer 600 also includes one or more input/output devices 610 that enable user interaction with computer 600 (e.g., display, keyboard, mouse, speakers, buttons, etc.).

Processor 602 may include both general and special purpose microprocessors, and may be the sole processor or one of multiple processors of computer 600. Processor 602 may comprise one or more central processing units (CPUs), for example. Processor 602, data storage device 604, and/or memory 606 may include, be supplemented by, or incorporated in, one or more application-specific integrated circuits (ASICs) and/or one or more field programmable gate arrays (FPGAs).

Data storage device 604 and memory 606 each comprise a tangible non-transitory computer readable storage medium. Data storage device 604, and memory 606, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 610 may include peripherals, such as a printer, scanner, display screen, etc. For example, input/output devices 610 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including task processor 106, task database 110, document applications such as word processing application shown in window 302 of FIG. 3, task assignee device 114, and task assignor device 100, may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention

The invention claimed is:

1. A method for managing task assignments, performed on a computer system having one or more processors and memory storing one or more programs for execution by the one or more processors to perform the method, comprising:
 receiving input within a document from a task assignor indicating that the task assignor wants to associate a task with the document;
 embedding a task tag in the document;
 identifying the task tag embedded in the document, the task tag comprising task parameters;
 generating a task record based on the task parameters;
 determining that the document is required in order to perform a task identified by the task parameters based on the task tag being embedded in the document;
 linking the task record to the document based on the determining;
 storing the task record in a task database; and
 granting a user identified in the task record permission to modify the task record.

2. The method of claim 1 further comprising: generating a task notification based on the task record; transmitting the task notification to a user identified by at least one of the task parameters.

3. The method of claim 2 wherein the task notification includes an interface for receiving input from a user.

4. The method of claim 2 further comprising:
 updating at least one task parameter based on a response to the task notification.

5. The method of claim 1 further comprising:
 receiving an indication that a task associated with the task record has been completed; and
 updating a task status based on the indication that the task has been completed, wherein the task status is one of the task parameters.

6. The method of claim 5 further comprising:
 transmitting a task notification indicating that a task has been completed based on the updating a task status based on the indication that the task has been completed.

7. The method of claim 2 further comprising:
 updating a task status based on not receiving a response to a task notification, wherein the task status is one of the task parameters.

8. The method of claim 1 wherein the document is one of a word processing document, a spreadsheet, a presentation, a database, an email, an instant message, and an SMS message.

9. An article of manufacture including a tangible computer-readable medium having instructions stored thereon, that in response to execution by a computing device cause the computing device to perform operations comprising:
 receiving input within a document from a task assignor indicating that the task assignor wants to associate a task with the document;
 embedding a task tag in the document;
 identifying the task tag embedded in the document, the task tag comprising task parameters;
 generating a task record based on the task parameters;
 determining that the document is required in order to perform a task identified by the task parameters based on the task tag being embedded in the document;
 linking the task record to the document based on the determining;
 storing the task record in a task database; and
 granting a user identified in the task record permission to modify the task record.

10. The article of manufacture of claim 8 wherein the operations further comprise:
 generating a task notification based on the task record;
 transmitting the task notification to a user identified by at least one of the task parameters.

11. The article of manufacture of 10 wherein the task notification includes an interface for receiving input from a user.

12. The article of manufacture of claim 10 wherein the operations further comprise:
 updating at least one task parameter based on a response to the task notification.

13. The article of manufacture of claim 9 wherein the operations further comprise:
 receiving an indication that a task associated with the task record has been completed; and
 updating a task status based on the indication that the task has been completed, wherein the task status is one of the task parameters.

14. The article of manufacture of claim 13 wherein the operations further comprise:
 transmitting a task notification indicating that a task has been completed based on the updating a task status based on the indication that the task has been completed.

15. The article of manufacture of claim 10 wherein the operations further comprise:
 updating a task status based on not receiving a response to a task notification, wherein the task status is one of the task parameters.

16. A system for managing task assignments comprising:
 one or more processors; and
 memory storing one or more programs to be executed by the one or more processors;
 the one or more programs comprising instructions to:
 receive input within a document from a task assignor indicating that the task assignor wants to associate a task with the document;
 embed a task tag in the document;
 identify the task tag embedded in the document, the task tag comprising task parameters;
 generate a task record based on the task parameters;
 determine that the document is required in order to perform a task identified by the task parameters based on the task tag being embedded in the document;
 link the task record to the document based on the determining;
 store the task record in a task database; and
 grant a user identified in the task record permission to modify the task record.

17. The system of claim 16 wherein the task processor is further configured to:
 generate a task notification based on the task record;
 transmit the task notification to a user identified by at least one of the task parameters.

18. The system of claim 17 wherein the task notification includes an interface for receiving input from a user.

19. The system of claim 17 wherein the task processor is further configured to:
 update at least one task parameter based on a response to the task notification.

20. The system of claim 16 wherein the task processor is further configured to:
 receive an indication that a task associated with the task record has been completed; and update a task status based on the indication that the task has been completed, wherein the task status is one of the task parameters.

21. The system of claim 20 wherein the task processor is further configured to:
transmit a task notification indicating that a task has been completed based on the updating a task status based on the indication that the task has been completed.

22. The system of claim 17 wherein the task processor is further configured to:
update a task status based on not receiving a response to a task notification, wherein the task status is one of the task parameters.

23. A method for managing task assignments performed on a computer system having one or more processors and memory storing one or more programs for execution by the one or more processors to perform the method comprising:
receiving input within a document from a task assignor indicating that the task assignor wants to associate a task with the document;
embedding a task tag in the document;
processing the document at a task processor to identify a plurality of task parameters;
generating a task record based on the plurality of task parameters;
determining that the document is required in order to perform a task identified by the task parameters based on the task tag being embedded in the document;
associating the task record with the document based on the determining;
storing the task record in a task database; and
granting a user identified in the task record permission to modify the task record.

24. The method of claim 23 further comprising:
generating a task notification based on the task record;
transmitting the task notification to a user identified by at least one of the plurality of task parameters.

25. The method of claim 24 wherein the task notification includes an interface for receiving input from a user.

26. The method of claim 24 further comprising:
updating at least one of the plurality of task parameters based on a response to the task notification.

27. The method of claim 23 further comprising:
receiving an indication that a task associated with the task record has been completed; and
updating a task status based on the indication that the task has been completed, wherein the task status is one of the plurality of task parameters.

28. The method of claim 27 further comprising:
transmitting a task notification indicating that a task has been completed based on the updating a task status based on the indication that the task has been completed.

29. The method of claim 24 further comprising:
updating a task status based on not receiving a response to a task notification, wherein the task status is one of the plurality of task parameters.

30. A graphical user interface, comprising:
a field configured to allow a task assignor to provide input associating a task with a document;
a field configured to display information pertaining to a task related to the document, the information comprising task parameters associated with the task and modifiable by a task assignee, wherein input from a task assignor embeds a task tag in the document and generates a task record and links to the document based on a determination that the document is required in order to perform the task identified by the task parameters based on a task tag being embedded in the document, the task tag comprising the task parameters;
a field configured to display comments from the task assignor and receive comments from the task assignee; and
a field configured to accept input from the task assignee indicating that the task assignee one of accepts and declines the task, wherein the input from the task assignee causes updating of the task record located in a task database,
wherein fields of the graphical user interface are modifiable by a user based on the user being identified in the task record.

31. A method for automatically generating a task associated with a document, performed on a computer system having one or more processors and memory storing one or more programs for execution by the one or more processors to perform the method comprising:
receiving input within the document from a task assignor indicating that the task assignor wants to associate a task with the document;
receiving task parameters from the task assignor, the task parameters related to the task;
embedding a task tag in the document, the task tag comprising the task parameters;
receiving input from the task assignor releasing the document;
scanning the released document to identify the task tag;
generating a task record based on the task parameters of the task tag;
determining that the document is required in order to perform the task based on the task tag being embedded in the document;
linking the task record to the document based on the determining;
storing the task record in a task database;
generating a task notification based on the task record;
sending the task notification to a task assignee identified in the task record, the task notification comprising task parameters including a link to the document; and
granting a user identified in the task record permission to modify the task record.

32. The method of claim 31 further comprising:
receiving input from the task assignee, the input comprising an indication that the task assignee one of accepts and declines the task;
updating the task record based on the input from the task assignee.

33. The method of claim 32 further comprising:
generating an update notification indicating input has been received from the task assignee regarding the task;
transmitting the update notification to the task assignor.

34. A system for managing task assignments comprising:
one or more processors; and
memory storing one or more programs to be executed by the one or more processors; the one or more programs comprising instructions for:
receiving input within the document from a task assignor indicating that the task assignor wants to associate a task with the document;
receiving task parameters from the task assignor, the task parameters related to the task;
embedding a task tag in the document, the task tag comprising the task parameters;
receiving input from the task assignor releasing the document;
scanning the released document to identify the task tag;

generating a task record based on the task parameters of the task tag;
determining that the document is required in order to perform the task based on the task tag being embedded in the document;
linking the task record to the document based on the determining;
storing the task record in a task database;
generating a task notification based on the task record;
sending the task notification to a task assignee identified in the task record, the task notification comprising task parameters including a link to the document; and
granting a user identified in the task record permission to modify the task record.

35. The system of claim 34 further comprising instructions for:
receiving input from the task assignee, the input comprising an indication that the task assignee one of accepts and declines the task; and
updating the task record based on the input from the task assignee.

36. The system of claim 35 further comprising instructions for:
generating an update notification indicating input has been received from the task assignee regarding the task; and
transmitting the update notification to the task assignor.

37. A non-transitory computer readable storage medium storing one or more programs configured for execution by a computer, the one or more programs comprising instructions for:
receiving input within the document from a task assignor indicating that the task assignor wants to associate a task with the document;
receiving task parameters from the task assignor, the task parameters related to the task;
embedding a task tag in the document, the task tag comprising the task parameters;
receiving input from the task assignor releasing the document;
scanning the released document to identify the task tag;
generating a task record based on the task parameters of the task tag;
determining that the document is required in order to perform the task based on the task tag being embedded in the document;
linking the task record to the document based on the determining;
storing the task record in a task database;
generating a task notification based on the task record;
sending the task notification to a task assignee identified in the task record, the task notification comprising task parameters including a link to the document; and
granting a user identified in the task record permission to modify the task record.

38. The non-transitory computer readable storage medium of claim 37, further comprising instructions for:
receiving input from the task assignee, the input comprising an indication that the task assignee one of accepts and declines the task; and
updating the task record based on the input from the task assignee.

39. The non-transitory computer readable storage medium of claim 38, further comprising instructions for:
generating an update notification indicating input has been received from the task assignee regarding the task; and
transmitting the update notification to the task assignor.

* * * * *